(12) United States Patent
Braun (10) Patent No.: US 7,099,419 B2
(45) Date of Patent: Aug. 29, 2006

(54) METHOD OF EQUALIZING A RECEIVED SIGNAL, RECEIVER AND RECEIVING STATION FOR IT

(75) Inventor: Volker Braun, Stuttgart (DE)

(73) Assignee: Alcatel, Paris (FR)

( * ) Notice: Subject to any disclaimer, the term of this patent is extended or adjusted under 35 U.S.C. 154(b) by 791 days.

(21) Appl. No.: 10/217,425

(22) Filed: Aug. 14, 2002

(65) Prior Publication Data

US 2003/0043892 A1 Mar. 6, 2003

(30) Foreign Application Priority Data

Aug. 16, 2001 (EP) ................... 01440265

(51) Int. Cl.
 *H04B 1/10* (2006.01)
(52) U.S. Cl. .................................... 375/350
(58) Field of Classification Search ............... 375/350, 375/229, 230, 231, 232, 233, 316, 346, 377, 375/293, 286, 354, 355, 357; 379/338, 340; 340/500, 681, 679, 501, 825, 825.2; 370/310, 370/350, 343, 464, 498, 503, 520; 455/39, 455/500, 501, 502
See application file for complete search history.

(56) References Cited

U.S. PATENT DOCUMENTS

| | | | |
|---|---|---|---|
| 5,483,557 A | 1/1996 | Webb | |
| 5,715,279 A | 2/1998 | Laakso et al. | |
| 5,805,638 A | 9/1998 | Liew | |
| 5,841,484 A | 11/1998 | Hulyalkar et al. | |
| 5,881,097 A | 3/1999 | Lilleberg et al. | |
| 5,930,289 A | 7/1999 | Laakso et al. | |
| 5,933,457 A | 8/1999 | Hottinen | |
| 6,011,813 A | 1/2000 | Ghosh | |

6,044,111 A  3/2000 Meyer et al.

(Continued)

FOREIGN PATENT DOCUMENTS

EP 0772306 A2 5/1997

(Continued)

OTHER PUBLICATIONS

Thorsten Petermann et al, "Iterative Blind and Non-Blind Channel Estimation in GSM Receivers", IEEE Symposium on Personal, Indoor and Mobile Radio Communications, London, UK Sep. 18-21, 2000.

(Continued)

*Primary Examiner*—Pankaj Kumar
(74) *Attorney, Agent, or Firm*—Sughrue Mion, PLLC (57) ABSTRACT

In many telecommunication systems, message signals which include a predefined sample bit sequence (training sequence) are transmitted, to improve the signal processing in the receiver, particularly the equalization. For this purpose, on the basis of the sample bit sequence, the channel pulse response is estimated within an iterative method. Extending the sample bit sequence by those bits which result from the reconstruction of the transmitted signal is known. It is here proposed that the equalization stage is synchronized to the received signal, by using at least the second channel pulse response which is estimated using the extended sample bit sequence. For this purpose, the receiver includes suitable synchronization means. In this way, it is achieved that the equalization is precisely adapted to the temporal course of the channel pulse response, so that the equalization of the received signal can be significantly improved. In tests, improvements to the signal-to-noise ratio of about 0.5 dB were achieved. Preferably, for the iterative channel estimate, the extended sample bit sequence is divided into two or more parts in the case of rapid channel changes such as can occur in mobile communication systems.

14 Claims, 4 Drawing Sheets

U.S. PATENT DOCUMENTS 6,148,023 A 11/2000 Pelin et al.
2001/0004390 A1 6/2001 Pukkila et al.

FOREIGN PATENT DOCUMENTS

EP 1107524 A2 6/2001
WO WO 9960759 11/1999

OTHER PUBLICATIONS

Magnus Sandell et al, "Iterative channel estimation using soft decision feedback", pp. 3728-3733, Sep. 1998, IEEE.

Markku Pukkila, "Channel Estimation Modeling", pp. 1-15, S-72. 333 Postgraduate Course in Radiocommunications, Fall 2000.

PIMRC 2000 Session List—Sep. 18-21, 2000.

Hyoung-kyu Song, "A Channel Estimation Using Sliding Window Approach and Tuning Algorithm for MLSE", IEEE Communications Letters, vol. 3, No. 7, Jul. 1999, pp. 211-213.

Nikolai Nefedow et al, "Iterative Channel Estimation for GPRS", IEEE Symposium on Personal, Indoor and Mobile Communications, London, Sep. 18-22, 2000, pp. 999-1003.

Babak H. Khalaj et al, "Spatio-temporal Channel Estimation Techniques for Multiple Access Spread Spectrum Systems with Antenna Arrays", 1995 IEEE, XP000535015—publication date Jun. 18, 1995.

METHOD OF EQUALIZING A RECEIVED SIGNAL, RECEIVER AND RECEIVING STATION FOR IT

BACKGROUND OF THE INVENTION

The invention is based on a priority application EP 01 440 265.5 which is hereby incorporated by reference.

The invention concerns a method of equalizing a received signal, which is derived from a transmitted signal which is transmitted encoded via a transmission channel, and which includes a predefined sample bit sequence according to the pre-characterizing clause of claim 1.

The invention also concerns a receiver, which includes an equalization stage, and a receiving station which is equipped with it according to one of the accompanying claims.

In many telecommunication systems, message signals which include a predefined sample bit sequence are transmitted and received. There are both wire-connected and wireless telecommunication systems such as the Global System for Mobile Communications (GSM), in which such message signals are transmitted. Unlike the so-called "payload" part of the message signal, the sample bit sequences do not carry useful data, but signaling data which is used to improve the signal processing in the receiver and also to identify the message packets. These sample bit sequences are often called "training sequences". If they are included at the start or middle of the message signal, they are also often called briefly "preamble" or "midamble".

In the published patent application U.S. Pat. No. 2001/0004390 A1, a receiver for TDMA message signals, particularly TDMA radio signals, is described. This includes an equalizer in which iterative channel estimation is carried out (see, for instance, page 1, first three paragraphs). First, using the predefined sample bit sequence ("training sequence"), a first channel estimate of the transmission channel is carried out, and a first estimated channel pulse response is determined (see page 1, Section 0010 "generating an initial estimate of the pulse response of the radio channel"). Then, using the first estimated channel estimate, the received signal is equalized in an equalization stage of the receiver (see page 1, Section 0011). A second channel estimate is also made (see page 1, Section 0015 "generating an updated estimate"), so-called "feedback information" being used. The method is described there in more detail on the basis of FIG. 2, on page 3, Section 0038 ff, particularly Section 0041. According to that, the "feedback information" corresponds to an extended sample bit sequence ("sample sequence with more known symbols"), which includes bits of the pre-defined sample bit sequence ("training sequence") as well as bits of a signal which is fed back through blocks "206" and "207", these bits being adapted to the values of the original transmitted signal (see Section 0040 "are compatible with the original sample vector y"). This means that a reconstructed transmitted signal is formed by blocks "206" and "207" using the equalized received signal, and then, using an extended sample bit sequence, at least one second channel estimate ("updated channel estimate") of the transmission channel is carried out and at least one second estimated channel pulse response is determined. This known iterative method improves the channel estimate directly by using an extended sample bit sequence, but the equalization itself is only improved indirectly, to the extent of the quality of the calculated channel pulse response.

SUMMARY OF THE INVENTION

The object of the invention is therefore to provide a method of the above-mentioned kind, in which the equalization is improved directly. Additionally, a receiver working according to the method and a receiving station which is equipped with it are proposed.

The object is achieved by a method with the features of claim 1 and by a receiver and receiving station with features according to one of the accompanying claims.

Accordingly, it is proposed that the equalization stage is synchronized to the received signal, by using at least the second channel pulse response which is estimated using the extended sample bit sequence. For this purpose, the receiver includes synchronization means which analyze at least the second channel pulse response which is estimated using the extended sample bit sequence, and thus synchronize the equalization stage to the received signal.

In this way, it is achieved that the equalization is precisely adapted to the digital representation of the channel pulse response, so that the equalization of the received signal can be significantly improved. This means that the position and length of a time window which includes the relevant taps which represent the channel pulse response is specified. The equalization is thus adapted to the optimal window. In tests, improvements to the signal-to-noise ratio of about 0.5 dB were achieved.

Particularly advantageous features of the invention result from the subclaims.

It is particularly advantageous according to them if the equalization stage is synchronized to the received signal, by using the first channel pulse response which was estimated using the predefined sample bit sequence. In this way a further improvement is achieved without particular additional cost.

It is also particularly advantageous if the equalized received signal is decoded in the receiver to an output signal, and if the second channel estimate of the channel pulse response, which is carried out using the extended sample bit sequence, takes place only if it has previously been established that the output signal includes more than a permitted number of frame errors. In this way, it is achieved that the iteration is aborted immediately if the received signal can be decoded sufficiently well.

It is also particularly advantageous if the receiver receives the received signal from a mobile transmitting station, and if, before the extended sample bit sequence is used for the second channel estimate, it is established that the mobile transmitting station is moving faster than a permitted speed, and if then only a first part of the extended sample bit sequence is used for the channel estimate at first. By these special measures, which are used for mobile communication connections, it is possible, even with rapid changes of the movement profile and correspondingly rapid changes of the radio propagation conditions, to equalize sufficiently well and quickly. The same applies, to the same extent, to the case that the receiver itself is integrated into a mobile receiving station. In relation to this, it is advantageous if a second part of the extended sample bit sequence is then used for the channel estimate, both parts including different bits but also common bits. In this way a division of the sample bit sequence into at least two smaller, partly overlapping sections is achieved. This is particularly useful if the common bits consist of bits from the predefined sample bit sequence, ensuring that each section includes at least some test bits of the predefined sample bit sequence, i.e. of the training sequence.

Additionally, it is particularly advantageous if the received signal is received by the receiver via at least two antennas (aerials) which are separated from each other in the form of diversity antennas or antenna arrays, as antenna signals via correspondingly many antenna paths, and if these antenna signals are combined into a received signal by an analysis of the estimated channel pulse response, this combination being iteratively repeated (e.g. by so-called "maximum ratio combining" or "equal weight combining"), each time using the last estimated channel pulse response. In this way iterative equalization and diversity or antenna array reception are combined with each other, thus achieving a particularly great quality gain. The invention can be used for all imaginable transmission methods, particularly TDMA or CDMA transmission methods.

For the case of CDMA transmission methods in which a rake receiver is used, it is particularly advantageous if first the first channel estimate and a temporal diversity combination of the rake fingers are carried out, and then a spatial diversity combination over all antenna paths is carried out, so that finally the acquired signal can be decoded. The same applies to the reverse sequence, in which first the first channel estimate and a spatial diversity combination over all antenna paths are carried out, and then a temporal diversity combination of the rake fingers is carried out. In relation to this, it is particularly advantageous if the decoded signal is encoded again, if the second channel estimate is carried out with it, if the spatial and temporal diversity combinations are then carried out again and if the newly acquired signal is then decoded.

BRIEF DESCRIPTION OF THE DRAWINGS

The invention and the resulting advantages are now described in more detail on the basis of two embodiments, referring to the following drawings, which give schematic representations.

DETAILED DESCRIPTION OF THE INVENTION

Figure 1A:
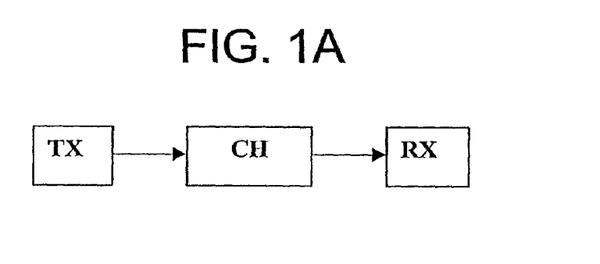
FIG. 1a shows the basic structure of a message transmission system.

In FIG. 1a, the structure of a traditional message transmission system is shown schematically. Essentially, the system consists of a transmitter TX, a receiver RX and a transmission channel CH which is provided for message transmission. This schematic diagram applies equally to wire-connected and wireless systems. The message transmission channel CH can thus be in the form of a line connection, such as by cable or optical waveguide, or by a radio connection such as a mobile communication connection. What follows refers particularly to mobile communication systems. Additionally, with respect to the type of message transmission, the widest range of message transmission methods can be used, e.g. TDMA or CDMA transmission methods. As far as TDMA methods are concerned, in particular transmission modes which are known from GSM (Global System for Mobile Communications) should be named, such as GPRS (General Packet Radio Service) or EDGE (Evolved Data for GSM Evolution).

Figure 1B:
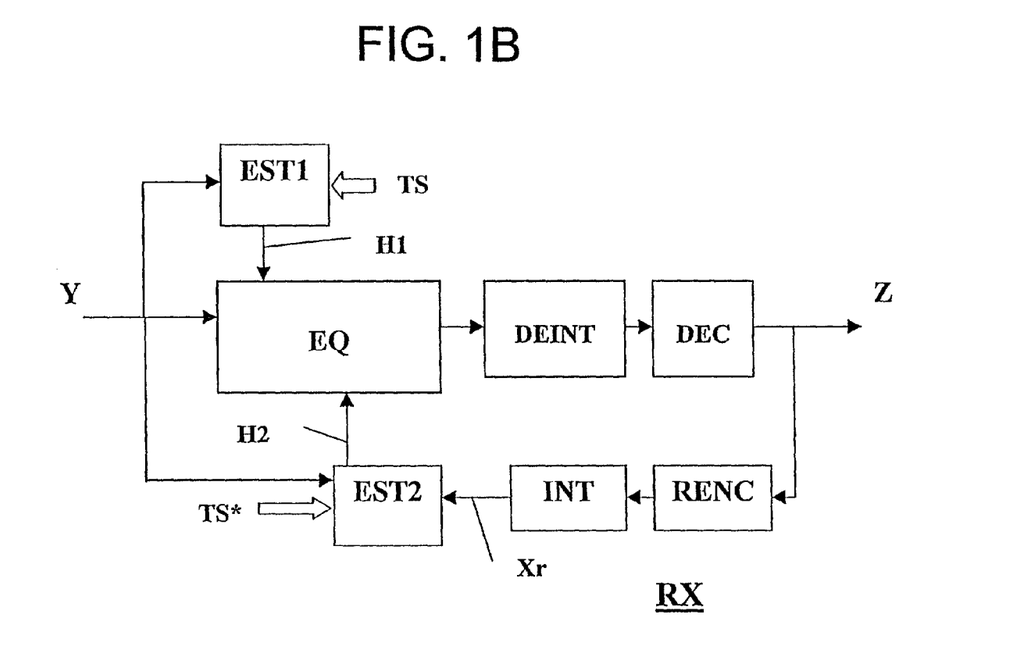
FIG. 1b shows the structure of a known receiver.

FIG. 1b shows a traditional receiver RX, which receives a received signal Y which is transmitted via the message transmission channel, and then equalizes it and processes it further, in particular decodes it. The receiver RX has an equalization stage EQ, to the input of which the received signal Y is applied. The output of the equalization stage EQ is connected to signal processing means DINT and DEC, which first deinterleave the equalized signal and then decode it. In this case we assume a received signal which is encoded as in the context of a TDMA radio transmission and transmitted in interleaved form. Through the equalization which is carried out on the receiving side and the subsequent deinterleaving and decoding, an output signal Z, which reproduces the message content of the received signal, is obtained at the output of the receiver. To control the equalization stage EQ, the receiver RX also has signal analysis means EST1 and EST2, which essentially carry out a channel estimate as part of an iterative method such as is described in patent application U.S. 2001/0004390 A1 which was mentioned at the beginning. First a first channel estimate EST1 is carried out on the basis of a specified sample bit sequence (training sequence TS). From this a first estimated channel pulse response H1, with which the equalization stage EQ can be optimally set, is obtained. In a second pass, on the basis of a second channel estimate EST2, a second estimated channel pulse response H2 is determined, to optimize the equalization stage EQ yet further. Forming a reconstructed transmitted signal Xr from the output signal Z by an encoding RENC followed by interleaving INT is known. On the basis of this reconstructed transmitted signal Xr, an extended sample bit sequence TS* is formed, and is then used for the second channel estimate EST2, so that finally the second estimated channel pulse response H2 is obtained.

Figure 1C:
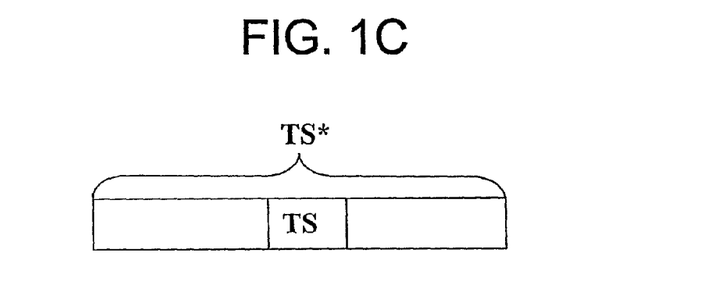
FIG. 1c shows the known structure of an extended sample bit sequence.

In FIG. 1c, such an extended sample bit sequence T* is shown. It is known that this extended sample bit sequence T* is formed by using the bits of the predefined sample bit sequence (training sequence TS) and those of the reconstructed transmitted signal Xr. In this way, the second channel estimate ST2 (see FIG. 1b) is put onto a greater data basis, so that a better estimated second channel pulse response H2 can be determined.

The known method which is described on the basis of FIGS. 1a, 1b and 1c and the receiver which works according to it achieve an improved channel estimate, but the equalization itself is improved only indirectly, and to the extent of the quality of the calculated second channel pulse response.

Figure 2A:
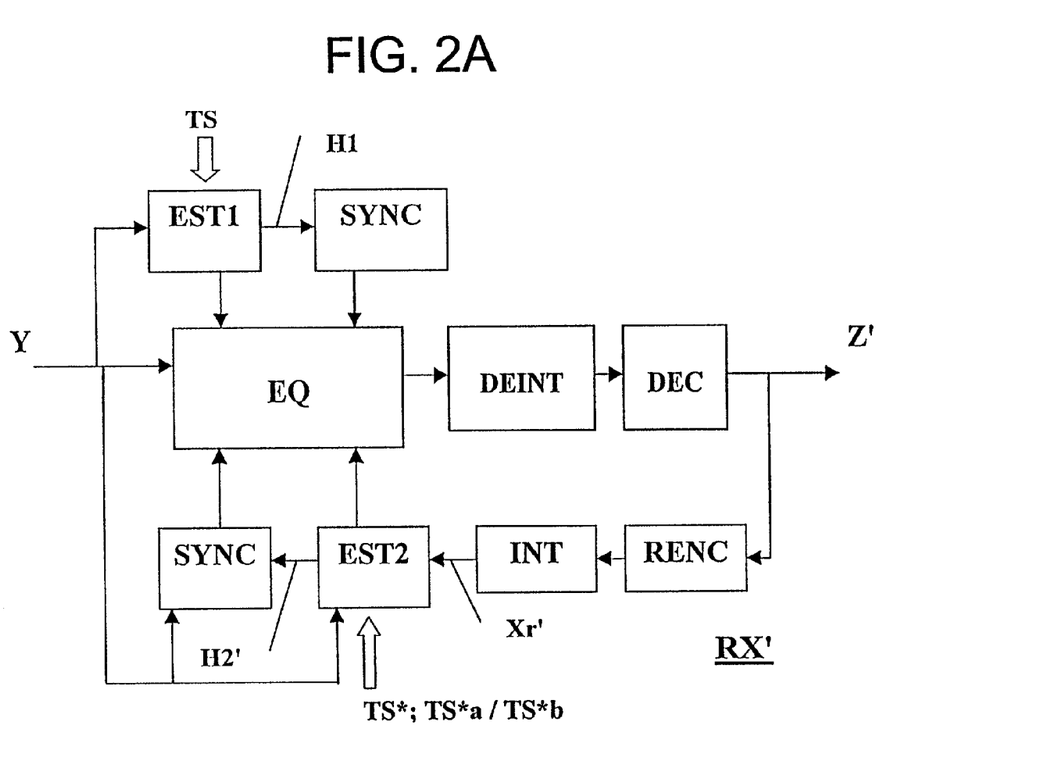
FIG. 2a shows the structure of a receiver according to the invention.

The figures described below show embodiments of the invention, with significantly improved receivers, and the flowchart of the improved method:

In FIG. 2a, the structure of a receiver RX', which is according to the invention and suitable for receiving TDMA signals, in particular in GPRS mode or EDGE mode, is shown schematically. Compared to the traditionally constructed receiver according to FIG. 1b, the receiver which is shown in FIG. 2a, as well as the previously mentioned components such as equalization stage EQ, deinterleaver DEINT, decoder DEC, encoder RENC, interleaver INT and signal analysis means EST1 and EST2, additionally has synchronization means SYNC for further optimization of the equalization stage EQ. These synchronization means SYNC obtain extensive information about the estimated channel pulse response from the channel estimate. This information consists of parameters, so-called taps, which reproduce both the amount and the temporal position of the channel pulse response. The taps thus give all the information which is required to describe the channel fully, and thus to carry out a precise (fine) synchronization to the received signal in the equalization stage EQ. A coarse synchronization of the received signal Y takes place in a stage (not shown) which is connected on the input side of the equalization stage EQ.

The (fine) synchronization of the equalization stage EQ as proposed here is preferably carried out in relation to each channel estimate, i.e. the first as well as the second, and optionally with each further channel estimate. However, the synchronization should at least take place in relation to the second channel estimate EST2. Compared to the prior art, improvements to the signal-to-noise ratio of about 0.5 dB are achieved. The frame error rate is also reduced. By the proposed synchronization, the equalization stage EQ takes the correct taps which are determined by the channel estimate. This cannot be achieved with the traditional methods and systems.

Additionally, it is proposed here that in the case of rapidly changing transmission properties, such as occur, for instance, in a mobile communication system on a mobile communication channel, only a part of the extended sample bit sequence is taken for the iterative channel estimate.

Figure 2B:
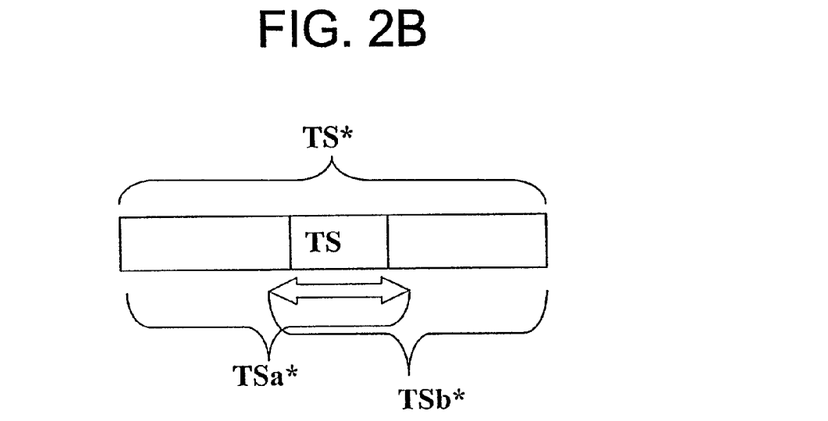
FIG. 2b shows an extended sample bit sequence according to the invention.

On the basis of FIG. 2b, such an extended sample bit sequence TS*, which includes the bits of the predefined sample bit sequence TS and other bits which are preferably derived from the reconstructed transmitted signal (see Xr' in FIG. 2a), is shown as an example. Depending on the changes on the transmission channel, for instance because of a rapidly moving transmitter (mobile station), here the whole extended sample bit sequence TS* is not used at once for a channel estimate, but individual parts of this sample bit sequence TS* are used in sections. For instance, if the speed of the transmitter is in a range above 150 k.p.h., the sample bit sequence TS* is divided into two parts, a first part TSa* and a second part TSb*. The two parts overlap and include at least some common bits, which are preferably derived from the predefined sample bit sequence TS. In the example which is shown in FIG. 2b, the two parts TSa* and TSb* overlap precisely to the extent that they both include exactly the bits of the predefined sample bit sequence TS. Versions in which the two parts TSa* and TSb* overlap more or less can be imagined. Because each part includes at least bits of the predefined sample bit sequence TS, a channel estimate can be carried out sufficiently reliably.

In a first substep, first the second channel estimate is carried out only on the basis of the first part TSa*, and later in a subsequent substep it is carried out again on the basis of the second part TSb*. Altogether, therefore, the extended sample bit sequence TS* is divided into two or more subdomains.

Figure 3:
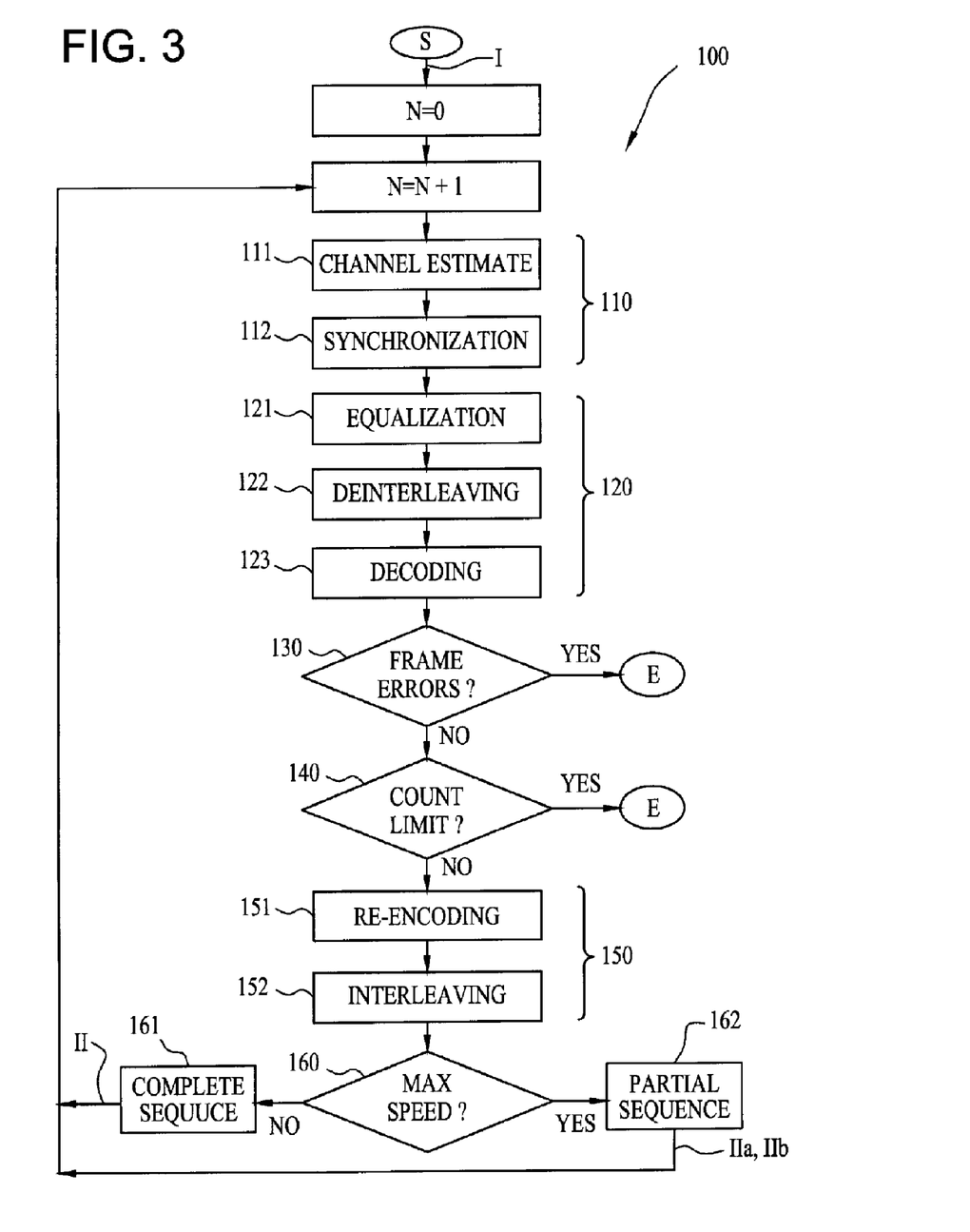
FIG. 3 shows the flowchart for a method according to the invention.

FIG. 3 shows a flowchart for the method according to the invention, with the improved iterative channel estimate. The method 100 comprises the steps 111 to 162, and runs as follows:

First, after the start of the method in step S, a loop counter is set to an initial value N=0. The first pass 1 (first iteration), in which the loop counter is first increased by 1 (N=N+1), follows. In the next step 111, the first channel estimate is carried out, and then the equalization stage is synchronized 112 to the received signal (see also EST1 and SYNC in FIG. 2a). The two substeps 111 and 112 form an action complex 110, which is used to prepare and control the equalization.

In the next step 121, the received signal is equalized, followed by the deinterleaving in step 122 and then the decoding of the received signal in step 123. The substeps 121 to 123 form an action complex 120, which directly carries out the equalization and further signal processing of the received signal. Thus an output signal is now available at the end of the decoding stage (see Z' in FIG. 2a).

In a step 130, the output signal is tested for frame errors. For instance, this test is done using a so-called CRC check. If no errors are present, processing continues with step 140. Otherwise, i.e. if there is a fault, the method is ended with step E.

If it was possible to decode the received signal without errors, step 140, in which the loop counter N is tested for reaching a specifiable maximum number, follows. This enquiry ensures that the method 100 carries out only a maximum number of iterations. If appropriate, the method then ends at step E. As was described above, the loop counter N here equals 1, i.e. we are still in the first iteration and only the first channel estimate has been carried out (see Step 111).

The method thus continues with step 151, where the further processing of the output signal data within a fed-back loop (see blocks RENC, INT, EST2 and SYNC in FIG. 2b) is carried out. Step 151 concerns the reencoding of the data. In the following step 152, the interleaving of the encoded data follows. Thus with these two substeps 151 and 152, a data reconstruction 150, which produces the reconstructed transmitted signal (see Xr' in FIG. 2a), takes place. This reconstructed transmitted signal is then used in the next iteration for further channel estimation.

However, first in step 160 there is an enquiry whether the mobile transmitting station which transmits the transmitted signal (it can also be the mobile receiving station itself which receives the signal) exceeds a specifiable speed of e.g. 150 k.p.h. If the speed of the mobile station is less, processing continues with step 161, where a simple extended sample bit sequence TS* is used. However, if the speed is above this threshold, in step 162 the extended sample bit sequence is divided into at least two parts TS*a and TS*b (cf. FIG. 2b). These two parts are used as partial sample bit sequences for the next iteration steps. Only in the case that the speed is less than the threshold, the whole sample bit sequence TS* is taken (step 161). There is also a test for whether, because of the station moving during a timeslot, a significant deterioration of the channel transmission properties because of so-called small scale fading occurs. If the deterioration results in a frame error rate which is greater than a permitted maximum value, a further iteration of the channel estimate with the extended sample bit sequence, which is optionally divided into smaller subunits, takes place. The frame error rate is here understood to mean the number of errors which occur within a data block or frame, which in turn corresponds to the transport unit which is defined by the number of bits and characters.

For further iteration, in both cases, i.e. with the whole or divided sample bit sequence, the method returns to the start, where first the counter N is increased by one. This is followed by a further channel estimate 111, on the basis of either the extended sample bit sequences TS* or the partial sample bit sequences TS*a or TS*b. This in turn is followed by a synchronization and the subsequent steps 121 to 123, so that at the end of step 123 an improved output signal is present. Further iterations can follow, until the abort criterion in step 140 is fulfilled or the decoding is sufficiently good, which is tested in step 130.

The proposed method 100 is thus a clearly improved iterative method of equalizing received signals, it being particularly taken into account that the message transmission channel can change very quickly because of the transmitter's movements or other effects.

This method can therefore be used particularly advantageously in mobile communication systems, and for the most varied transmission techniques. Use of the invention for both TDMA and CDMA mobile communication systems can be imagined. In the case of TDMA systems, an equalization stage according to the invention, such as is described e.g. on the basis of FIG. 2a, is integrated in the receiver. In the case of CDMA systems, the invention is implemented within a rake receiver, which so to speak takes the place of the equalization stage. In this sense, the term "equalization stage" should be broadly understood to include rake receivers. Since both components are demodulation components, the term "demodulation stage" could also be used as a higher-level term. Rake receivers are known per se. They carry out a temporal combination of signal parts, the so-called rake fingers.

Additionally, the method can advantageously be used in any receivers which receive the radio signals via multiple antennas. These are, in particular, diversity antennas with at least two spatially separated antennas, or antenna arrays with a plurality of equidistantly arranged antenna elements. In this way, via different antenna paths, correspondingly many antenna signals are received, and the receiver combines them into a received signal. In the case of diversity antennas, algorithms such as the so-called "maximum ratio combining" are used. In the case of antenna arrays, so-called "beam forming" algorithms are used. Depending on the type of radio transmission, the combination algorithms are implemented in the components of the receiver. According to the invention, the proposed iterative channel estimation method is now also linked to the respective combination algorithm.

Figure 4:
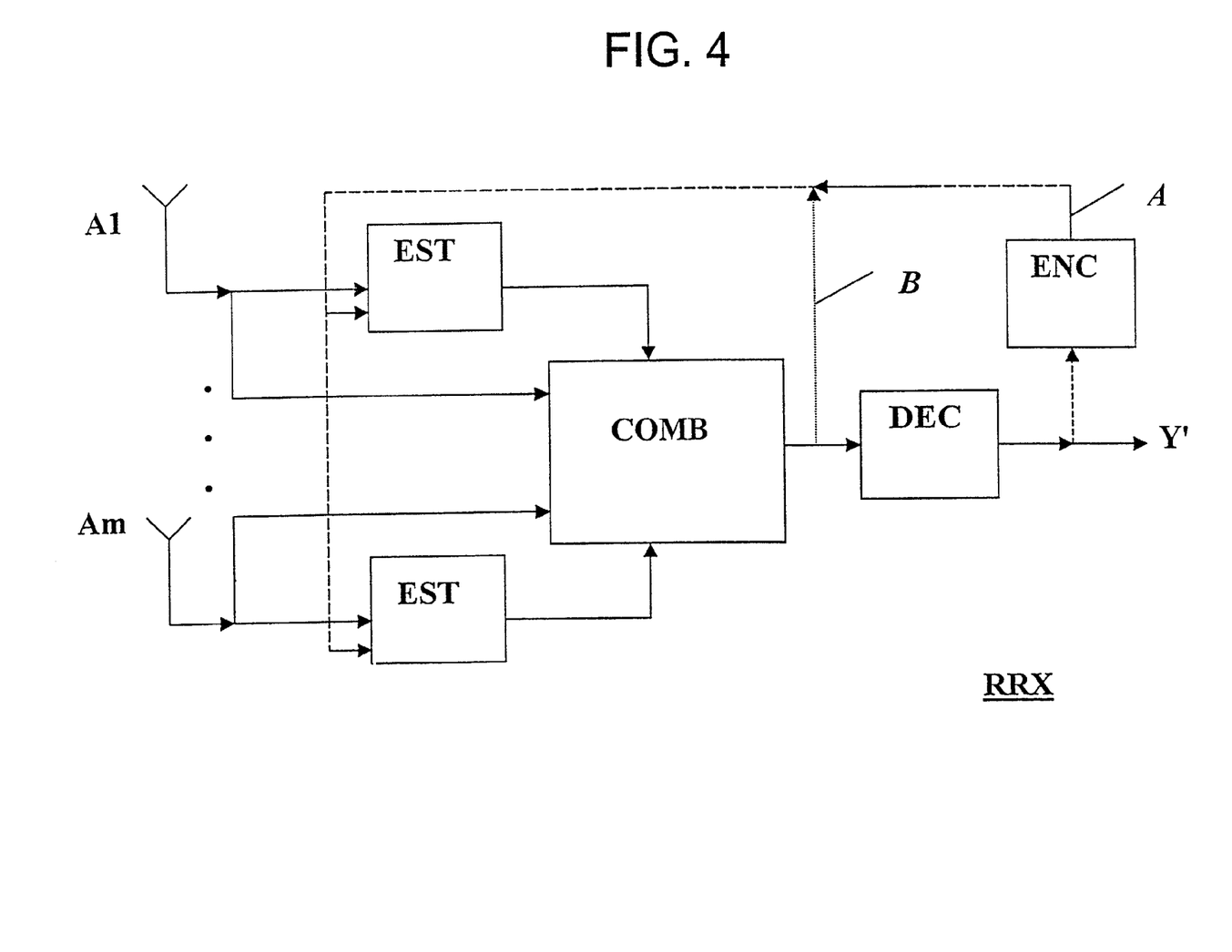
FIG. 4 shows the structure of a rake receiver according to the invention.

An example of a CDMA mobile communication system is described below, an arrangement of rake receivers, which are connected to a number m (m>1) of antenna elements of an antenna array, being used. This is therefore an m-dimensional rake receiver:

FIG. 4 represents an m-dimensional rake receiver RRX, which firstly combines the signal parts temporally via the rake fingers for each antenna path, and secondly, via the m different antenna paths, carries out a spatial combination according to the so-called antenna diversity principle. From at least two antennas which are separated from each other, and here take the form of an antenna array with a plurality of antenna elements A1 to Am, the antenna signals are fed to the receiver and there combined with each other into a uniform received signal Y'. In the case of the spatial combination, the individual antenna signals are weighted and summed. Suitable combination algorithms are known per se, e.g. the so-called "equal weight combining". So-called "beam forming" algorithms can also be used. Both combinations, the temporal and the spatial, are carried out in the COMB stage, which essentially corresponds to an m-dimensional rake combination stage. The function of this stage is described in detail below.

The function blocks which are shown in FIG. 4 are intended to make clear that according to the invention both the proposed iterative channel estimation to improve the temporal combination in rake receivers and the spatial combination according to the antenna diversity principle can be used. For this purpose, on each antenna path a channel estimate, which is carried out according to the iterative method described above (see FIG. 3), is applied. The antenna signals go from the antennas directly to both the combination stage COMB and the channel estimators EST. These supply estimated channel pulse responses, which are used as parameters for the temporal and spatial combination in the COMB stage. The feedback loop A or B represents the iteratively executed method. In each pass, the relevant paths which are selected by the path profiler (not shown and integrated in the rake receiver) are taken as a basis. With the aid of the last estimated channel pulse response, and using a suitable algorithm, one of the paths which the path profiler recommends can be selected. Feedback A shows that for this purpose the signal which is decoded in the decoding stage is recoded. Feedback loop B shows that the output signal is used directly. The first method (loop A) has the advantage that the signal quality which is obtained by decoding the signal is used. On the other hand, the second method (loop B) is faster, and requires less processing power and less memory capacity.

The example which is shown in FIG. 4 concerns a rake receiver, which receives CDMA radio signals. Within the combination COMB, both temporal and spatial combinations are carried out, namely temporal combinations (temporal diversity combining) over the rake fingers of the individual received signals and spatial combinations (spatial diversity combining) over the various antenna paths. Irrespective of the sequence of combination, the result finally leads to a double summation of all the signal parts which are received on the various antenna paths. The double summation can be described by the following formula:

$$\sum_{m=1}^{M} \sum_{l=1}^{L} w_{m,l}^* \, r_m(t - \tau_l)$$

where r means the mth antenna signal and w* means the weighting for the lth rake finger of the mth antenna signal. The weighting is a function of the channel estimate.

Thus a double summation is formed over all spatial signal parts (antenna paths m=1 to M) and all temporal signal parts (rake fingers l=1 to L), for each tap (t-□).

On the basis of the example according to FIG. 4, it is proposed here that the iterative channel estimate should be used for the diversity combination in a CDMA receiver, the channel estimate optimizing both the temporal and the spatial combination.

The same principle can also be implemented for a TDMA receiver which has at least two diversity antennas in which the channel estimate on the one hand optimizes the equalization temporally by fine synchronization and on the other hand optimizes the spatial diversity combination (e.g. maximum ratio combining).

As described on the basis of FIGS. 2a to 2c, the invention can also be used in receivers which work without reception diversity (in the form of antenna diversity and/or rake reception). Irrespective of whether diversity is used on the reception side or not, the proposed improved channel estimation and equalization already gives clear advantages, such as are described above, in particular a gain of about 0.5 dB in the signal-to-noise ratio. A further increase results in systems in which transmission diversity is also used. This means that on the transmission side transmitted signals are transmitted via diverse antenna paths, and they reach the receiver as diverse received signal parts.

The described examples refer in particular to the use of the invention in the field of mobile communication systems, in particular TDMA systems, such as e.g. GSM with GPRS or EDGE mode, and also in CDMA mobile communication systems, such as e.g. UMTS (Universal Mobile Telecommunications System). There are numerous other examples of the use of the invention, not only in the field of wireless transmission technology but also in that of wire-connected transmission technology.

The invention claimed is:

1. A method of equalizing a received signal, which is derived from a transmitted signal which is transmitted encoded via a transmission channel, and which includes a predefined sample bit sequence, said method including the following steps:

using the predefined sample bit sequence, a first channel estimate of the transmission channel is carried out, and a first estimated channel pulse response is determined;

using the first estimated channel pulse response, the received signal is equalized in an equalization stage of a receiver to generate an equalized received signal;

using the equalized received signal; a reconstructed transmitted signal is formed;

then, using an extended sample bit sequence, which includes bits of the predefined sample bit sequence and bits of the reconstructed transmitted signal, at least one second channel estimate of the transmission channel is carried out, and at least one second estimated channel pulse response is determined; wherein the equalization stage is synchronized to the received signal, by using at least the second estimated channel pulse response which is estimated using the extended sample bit sequence.

2. A method according to claim 1, wherein the equalization stage is synchronized to the received signal, by also using the first estimated channel pulse response which is estimated using the predefined sample bit sequence.

3. A method according to claim 1, wherein the equalized received signal is decoded in the receiver to an output signal, and wherein the second channel estimate of the transmission channel which is carried out using the extended sample bit sequence takes place only if establishment has previously been made that the output signal includes more than a permitted number of frame errors.

4. A method according to claim 1, wherein the receiver receives the received signal from a mobile transmitting station, and wherein before the extended sample bit sequence is used for the second channel estimate of the transmission channel, it is established that the mobile transmitting station is moving faster than a permitted speed, and then only a first part of the extended sample bit sequence is used for the second channel estimate of the transmission channel at first.

5. A method according to claim 1, wherein the receiver is integrated into a mobile receiving station, and wherein before the extended sample bit sequence is used for the second channel estimate of the transmission channel, it is established that the mobile receiving station is moving faster than a permitted speed, and then only a first part of the extended sample bit sequence is used for the second channel estimate of the transmission channel at first.

6. A method according to claim 4, wherein a second part of the extended sample bit sequence is used for the second channel estimate of the transmission channel, both parts including different bits but also common bits.

7. A method according to claim 6, wherein the common bits consist of bits from the predefined sample bit sequence.

8. A method according to claim 1, wherein the received signal is received by the receiver via multiple antennas in the form of antenna signals via at least two antennas which are separated from each other in a form of diversity antennas or antenna arrays, wherein the antenna signals are combined into a combined received signal by a weighted combination using an analysis of the at least one second estimated channel pulse response, in particular by a diversity combination or a phase-correct combination, the phase information being acquired from the at least one second channel estimates of the transmission channel, and wherein the combination into said combined received signal is iteratively repeated, in each case using a last estimated channel pulse response.

9. A method according to claim 8, wherein:

the equalization stage is a rake receiver stage;

the synchronization to the received signal takes place by an adjustment of path profiles based on changes of the transmission channel;

the first channel estimate of the transmission channel and a temporal diversity combination of the rake fingers are carried out; and then a spatial diversity combination over all antenna paths is carried out after the temporal diversity combination.

10. A method according to claim 9, wherein the second channel estimate of the transmission channel is carried out using the extended sample bit sequence, then a repeated temporal diversity combination of the rake fingers is carried out, and then a repeated spatial diversity combination over all antenna paths is carried out.

11. A method according to claim 8, wherein:

the equalization stage is a rake receiver stage;

the synchronization to the received signal takes place by an adjustment of path profiles based on changes of the transmission channel;

the first channel estimate of the transmission channel and a spatial diversity combination over all antenna paths is carried out; and then a temporal diversity combination of rake fingers is carried out after the spatial diversity combination.

12. A method according to claim 11, wherein the second channel estimate of the transmission channel is carried out using the extended sample bit sequence, then a repeated spatial diversity combination over all antenna paths is carried out, and then a repeated temporal diversity combination of the rake fingers is carried out.

13. A receiver to receive a received signal, which is derived from a transmitted signal which is transmitted encoded via a transmission channel, and which includes a predefined sample bit sequence, with signal analysis means which carry out a first channel estimate of the transmission channel using the predefined sample bit sequence, and which determine a first estimated channel pulse response; with an equalization stage, which equalizes the received signal using the first estimated channel pulse response to form an equalized received signal; with signal reconstruction means, which form a reconstructed transmitted signal using the equalized received signal; and with computing means which generate an extended sample bit sequence, which includes bits of the predefined sample bit sequence and bits of the reconstructed transmitted signal, the signal analysis means, using the extended sample bit sequence, carrying out at least one second channel estimate of the transmission channel and determining at least one second estimated channel pulse response; wherein the receiver includes synchronization means, which analyze at least the second estimated channel pulse response which is estimated using the extended sample bit sequence, and thus synchronize the equalization stage to the received signal.

14. A receiving station, particularly mobile receiving station, with a receiver to receive a received signal, which is derived from a transmitted signal which is transmitted encoded via a transmission channel, and which includes a predefined sample bit sequence, with signal analysis means which cany out a first channel estimate of the transmission channel using the predefined sample bit sequence, and which determine a first estimated channel pulse response; with an equalization stage, which equalizes the received signal using the first estimated channel pulse response to form an equalized received signal; with signal reconstruction means, which form a reconstructed transmitted signal using the equalized received signal; and with computing means which generate an extended sample bit sequence, which includes bits of the predefined sample bit sequence and bits of the reconstructed transmitted signal, the signal analysis means, using the extended sample bit sequence, carrying out at least one second channel estimate of the transmission channel and determining at least one second estimated channel pulse response; wherein the receiver includes synchronization means, which analyze at least the second estimated channel pulse response which is estimated using the extended sample bit sequence, and thus synchronize the equalization stage to the received signal.

* * * * *